March 10, 1953    E. C. KIEKHAEFER    2,630,775
SLIP CLUTCH REVERSE GEAR COMBINATION FOR OUTBOARD MOTORS
Filed April 28, 1950
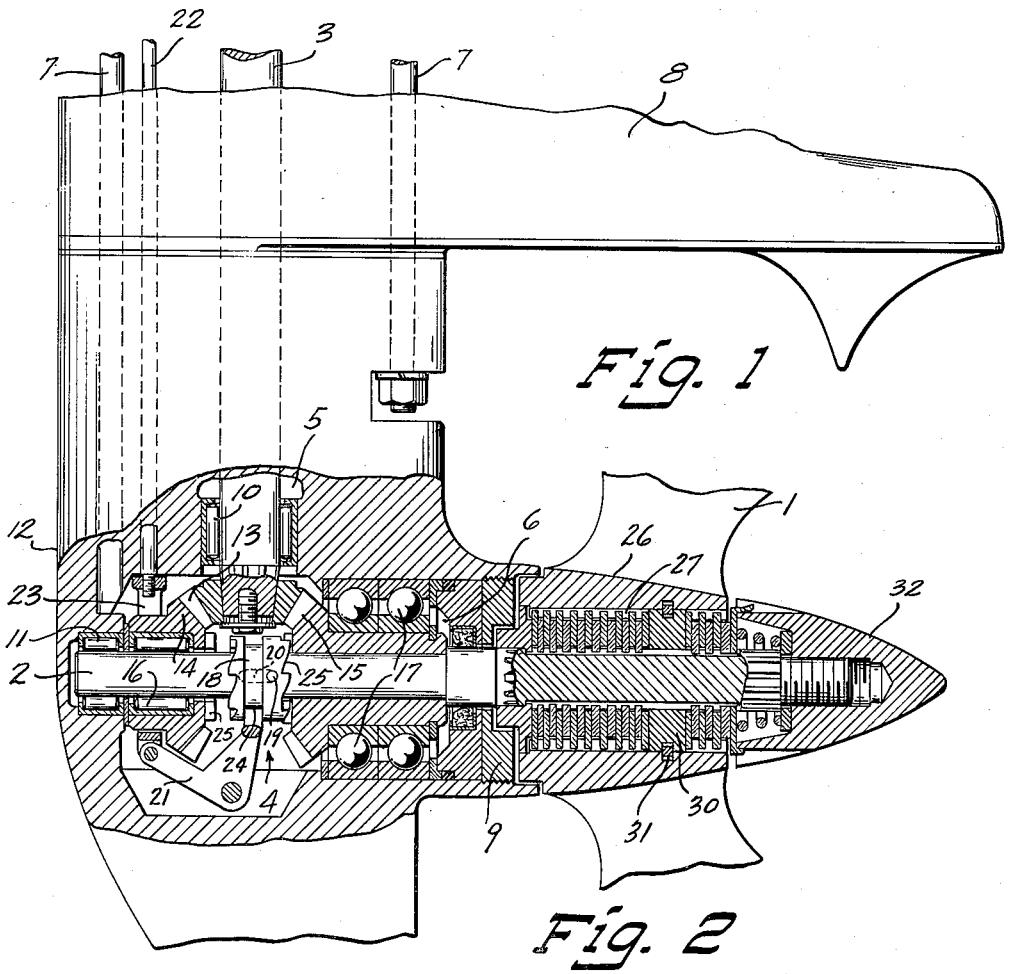
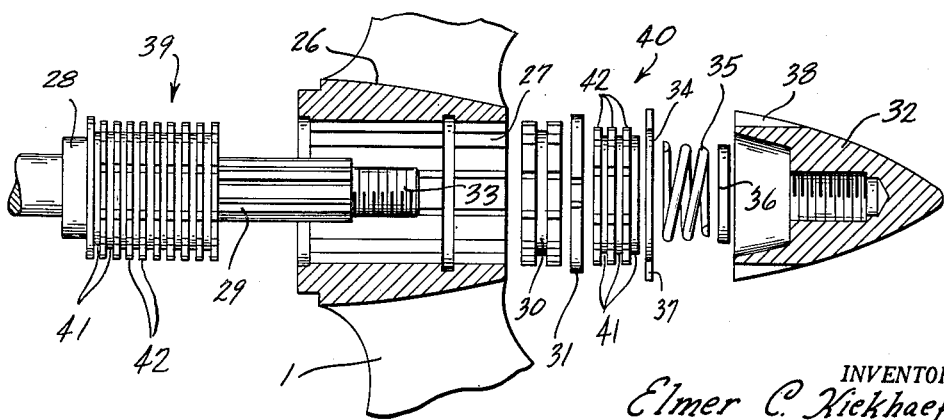
INVENTOR.
Elmer C. Kiekhaefer
BY
Andrus & Seeler
Attorneys Patented Mar. 10, 1953

2,630,775

UNITED STATES PATENT OFFICE 2,630,775

SLIP CLUTCH REVERSE GEAR COMBINATION FOR OUTBOARD MOTORS

Elmer C. Kiekhaefer, Cedarburg, Wis.

Application April 28, 1950, Serial No. 158,683

4 Claims. (Cl. 115—17)

This invention relates to marine transmissions, particularly for outboard motors.

The invention provides, in combination, a positive engagement clutch and a frictional engagement overload protective device arranged to prevent serious shock or impact of the gear and clutch teeth with direct change of drive rotation.

A principal object of the invention is to provide an improved selective forward, neutral and reverse propeller drive for outboard motors.

A more particular object is to provide and utilize a particular type of overload slip clutch to protect the propeller against damage in the operation of the motor and to protect the gears and ratchet engagement elements against impact-shock in shifting or changing the drive of gears.

A further object is to utilize the drag of the propeller to release the friction clutch in case of shifting at high speeds and to permit shifting into forward or reverse drive without in each case reducing the speed of the motor.

Another object is to provide a slip clutch which is responsive to the thrust of the propeller in either forward or reverse rotation or direction.

A further object is to provide different variable pressure engagements of the frictional clutch elements during the forward and reverse rotations of the propeller according to the torque capacity required of the clutch.

A more particular object is to provide a propeller with slip clutch protection against overload under given load conditions in one direction and other load conditions in the opposite direction.

These and other objects and advantages will be more fully set forth in the following description of a preferred embodiment of the invention illustrated in the accompanying drawing.

In the drawing:

Figure 1 is a side elevation of the lower underwater structure of an outboard motor with parts broken away and sectioned to show the construction thereof; and Fig. 2 is a similar view of the disassembled slip clutch unit of the propeller.

The outboard motor underwater drive unit shown in the drawing includes the propeller 1 mounted on shaft 2 for rotation therewith under normal conditions only, as will be described, and the vertical drive shaft 3 connected at its upper end to the engine, not shown.

The streamlined housing 4 of the underwater unit comprises a single cast member provided with communicating recesses 5 and 6 which open upwardly and rearwardly of the member, respectively. The bolts 7 secure housing 4 to the lower face of the drive shaft housing 8 which latter serves to close the upper end of housing 4. The threaded cylindrical closure member 9 within recess 6 at the rear of housing 4 serves to close the recess and to secure therein the bearings, referred to hereinafter, supporting shaft 2. The underwater unit is similar to that described and claimed in the copending applications of the present inventor, Serial No. 747,443, filed May 12, 1947, for Outboard Motor, now U. S. Patent No. 2,549,477 of April 17, 1951; and Serial No. 94,108, filed May 19, 1949, for Underwater Gear Unit for Outboard Motors, now U. S. Patent No. 2,549,484 of April 17, 1951.

The roller bearing 10 mounted in recess 5 of housing 4 supports the lower end of shaft 3 therein at right angles to shaft 2. Shaft 2 is disposed within recess 6 beneath shaft 3 and projects horizontally and rearwardly through a central hole in closure member 9. The forward end of shaft 2 is supported by the bearing 11 in the forward leading edge 12 of housing 4.

The beveled driving gear 13 is secured to the lower end of shaft 3 which projects into recess 6 of housing 4 and is in constant mesh with gears 14 and 15. Gears 14 and 15 are oppositely disposed on shaft 2 and driven by gear 13 in opposite directions.

Gear 14, disposed forwardly of shaft 3 and gear 13, is supported directly on shaft 2 by the roller bearings 16. The double row of bearings 17 secured within recess 6 by closure member 9, as referred to above, supports gear 15 rearwardly of shaft 3 and gear 13. Shaft 2 extending through gear 15 is supported therein for rotation therewith or independently of the rotation of gear 15, as will be described.

The collar 18 is disposed between gear 14 and 15 and is secured on shaft 2 to drive the same by the pin 19 extending through the slot 20 in the shaft. Slot 20 allows limited axial movement of collar 18 between gears 14 and 15 on the shaft as effected and controlled by the crank 21 pivotally carried in housing 4 beneath shaft 2. The control rod 22 connected to one end of crank 21 by the yoke 23 is disposed forwardly of shaft 3 and extends upwardly to manual control means, not shown, carried by the motor and provided for the operator's selective control of the rotation of propeller 1 in either direction, as will be described. The opposite forked end of crank 21 engages the annular groove 24 of the collar 18 to move the latter axially on shaft 2, as referred to above.

The end faces of collar 18 and the respective adjacent portions of gears 14 and 15 are toothed to comprise two positive-engagement clutches 25. Each clutch is adapted to provide the selective rotational engagement of collar 18 with either gear 14 or 15 upon shifting movement of collar 18 in a corresponding direction on shaft 2. The rotation of shaft 2 and propeller 1 in the direction of the gear engaged by collar 18 is thus provided. Sufficient clearances between collar 18 and gears 14 and 15 are provided to allow collar 18 to be disposed in "neutral" position between the gears and without engagement with either.

To accommodate the bearing support of gears 14 and 15, described above, propeller 1 is preferably pitched for forward propulsion upon rotation in the direction of and with rotation of gear 15. By reason of this fact the large ball bearings 17 are employed to support the shaft 2 during the normal forward drive under heavy loads, and rotation of the shaft in gear 15 is avoided. During non-drive periods the shaft 2 idles in gear 15 and during reverse drive periods shaft 2 rotates in an opposite direction to gear 15, but generally for short times and under light load conditions.

The streamlined, hollow hub 26 of the propeller shown in the drawing is open throughout its length and is formed internally with longitudinal splines 27 spaced relatively about the axis of the propeller. The circular thrust plate 28 carried on shaft 2 at the forward end of the splined section 29 of the shaft fits within the annular, enlarged portion of hub 26 to support the forward propeller end thereof radially upon the shaft. The collar 30 secured within the splined hub 26 near the rear end thereof by the snap-ring 31 fits the complementary annular grooves 27 in the hub and is provided with a central bore adapted to be supported rotationally free on the splined section of shaft 2 to center hub 26 thereon.

The tapered nut 32 turned on the threaded end 33 of shaft 2 is secured thereon by the splined tab washer 34. Washer 34 is biased forwardly on the splined section 29 of shaft 2, as will be more fully described hereinafter, by the spring 35 interposed between washer 34 and nut 32. If desired, the additional washer 36 may be disposed between spring 35 and nut 32, as shown.

Upon assembly of the clutch unit and propeller, as will be described, tabs 37 of washer 34 are bent to engage the corresponding notches 38 on the outside of nut 32 so that washer 34, being rotatably secured on the splined section of shaft 2 serves to prevent turning and release of nut 32 from the shaft.

The clutches 39 and 40 consist of alternately arranged friction elements or discs 41 and 42 disposed on shaft 2 within hub 26 respectively between thrust plate 28 and collar 30 and between collar 30 and washer 34.

Each disc 41 is internally splined so as to be rotatably secured on the splined section 29 of shaft 2 and rotate therewith. Each disc 42 is mounted on shaft 2 for free rotation thereon and is externally formed to engage splines 27 of hub 26 of the propeller.

Discs 41 and 42 are normally maintained axially in frictional engagement by spring 35 compressing the discs between plate 28 and washer 34 sufficiently to provide the capacity necessary to carry and transmit the starting torque from shaft 2 to propeller 1 upon rotation in either direction. Upon rotation of propeller 1 for forward propulsion the thrust of the propeller through collar 30 further increases the frictional engagement of discs 41 and 42 comprising clutch 39 to maintain variably the capacity of the clutch accordingly and at all times above the normal torque load. The combined capacity of clutches 39 and 40 is, however, maintained greater than the load only sufficiently to ensure against slippage under normal conditions, thus providing the maximum allowable slippage for safety and prevention of damage to the propeller upon overloading.

The propeller and slip-clutch device shown and described as above is similar to that described and claimed in the copending application of the present inventor, Serial No. 97,735, filed June 8, 1949, entitled Slip Clutch for Propeller, now U. S. Patent No. 2,605,850 of August 5, 1952. In normal operation the device serves particularly to protect the propeller against damage upon overload as when the propeller strikes an underwater object by reason of the relative disengagement of discs 41 and 42 comprising clutch 39 upon loss of thrust.

The reverse rotation of propeller 1 effecting a thrust in the reverse direction also releases clutch 39 as referred to above. At the same time collar 30 compresses discs 41 and 42 of clutch 40 rearwardly on shaft 2 against washer 34 to maintain the required clutch capacity above the torque load. It will be noted that fewer discs need be provided for clutch 40, however, by reason of the considerably lower operating requirements for reverse drive.

According to the present invention, clutches 39 and 40, in serving to protect propeller 1 against overload, also cushion the elements of clutches 25 against shock by absorbing a predetermined portion of the impact to which the clutch teeth would normally be subjected.

The degree of shock or impact and the possibility of damage to clutches 25 and gears 13, 14 and 15 is reduced as in outboard motors by reason of the short length and nominal mass of shaft 2 and discs 41 which are alone subjected to rotation immediately upon engagement of collar 18 with gear 14 or 15. By reason of the relatively nominal frictional engagement of discs 41 and 42 when the propeller is not being driven, collar 18 moves from "neutral" into driving engagement with either gear 14 or 15 when clutches 39 and 40 are of minimum capacity and propeller 1 is relatively free of shaft 2 with respect to the shock to which the shaft is subjected upon such engagement.

It should be noted that shifting of collar 18 into "neutral" while the motor is operating immediately allows propeller 1 free to rotate or "feather" in the water. The slight drag of the propeller in such cases if the boat is traveling rearwardly at limited speeds does not appreciably alter the capacity of the clutch to cushion a subsequent engagement of collar 18 and gear 15. If the motor and boat are traveling forwardly at high speeds the drag of propeller 1 releases clutch 39 and increases only slightly the capacity of clutch 40.

The number of discs 41 and 42 employed in each clutch unit 39 and 40 may be determined by the specifications of the propeller and other factors as the size of the discs and initial compression of spring 35. Low-pitch, high-speed propellers ordinarily require fewer discs 41 and 42 or no more than one each to comprise the clutch unit 40 for reverse drive. The initial compression of spring 35 if greater than maximum thrust developed by reverse propeller rotation would eliminate the need of clutch unit 40 entirely and effect the entire frictional torque transmission by clutch unit 39.

Various embodiments of the invention may be employed within the scope of the accompanying claims.

I claim:

1. In an outboard motor including a driving gear and oppositely rotating driven gears, a propeller, a shaft carrying said propeller, a positive engagement clutch member carried by said shaft and adapted to be moved axially thereon selectively to engage either of said driven gears to selectively drive the shaft in opposite directions, and separate slip clutch means connecting said propeller and shaft adapted to cushion the propeller against shock imposed on said shaft upon engagement of said clutch members, said slip clutch means being independently responsive respectively to the forward and rearward thrust of said propeller to maintain the clutch capacity within corresponding greater and lesser ranges and above the normal torque transmitted by said positive-engaging clutch elements.

2. In an outboard motor, a shaft, positive engagement clutch means adapted to provide the selective driving rotation of said shaft in either direction, a propeller carried by said shaft, and separate frictional clutch means respectively connecting said propeller and said shaft for driving the propeller in either of said directions, the capacity of said last named clutch means being subject to increase in direct relation to the thrust of the propeller in either direction and of reduced capacity at no-load to provide maximum cushioning of the shock transmitted through said shaft in either direction upon initial engagement of said first named clutch means.

3. In an outboard motor including a lower underwater unit, a propeller shaft supported by said unit, a propeller having a hub mounted on said shaft rearwardly of said unit and axially movable on said shaft, and means for driving said shaft selectively to effect rotation of the latter in either direction; separately operable slip clutch means rotationally connecting said shaft and said propeller comprising, an abutment plate fixed on said shaft, a second plate rotationally fixed on said shaft and spaced rearwardly of said first named plate, adjustable spring means mounted on said shaft biasing said second plate in the direction of said first named plate, an abutment member fixed within said hub and disposed intermediate said plates, and separate forward and rear friction means interposed between said member and said plates and disposed for frictional engagement to effect together the rotation of said propeller with said shaft in the forward direction, said forward means being responsive to the forward thrust of said propeller within a given range of maximum torque to drive said propeller in the forward directions and said rear friction means maintaining a minimum torque transmission according to the adjustment of said spring means, said rear friction means being responsive to the rearward thrust of said propeller to drive the latter in the reverse direction within a lesser range of maximum torque independently of said forward friction means.

4. In an outboard motor including a lower underwater unit, a propeller shaft supported by said unit, a propeller having a hub mounted on said shaft rearwardly of said unit and axially movable on said shaft, driven gears operating in opposite direction disposed within said lower unit and coaxially with said propeller shaft, and a clutch element selectively engageable with either of said gears and rotationally fixed with said shaft to effect rotation of the latter in either direction; separately operable slip clutch means rotationally connecting said shaft and said propeller comprising, an abutment plate fixed on said shaft, a second plate rotationally fixed on said shaft and spaced rearwardly of said first named plate, adjustable spring means mounted on said shaft biasing said second plate in the direction of said first named plate, an abutment member fixed within said hub and disposed intermediate said plates, and separate forward and rear friction means interposed between said member and said plates and disposed for frictional engagement to effect together the rotation of said propeller with said shaft in the forward direction, said forward means being responsive to the forward thrust of said propeller within a given range of maximum torque to drive said propeller in the forward direction and said rear friction means maintaining a minimum torque transmission according to the adjustment of said spring means, said rear friction means being responsive to the rearward thrust of said propeller to drive the latter in the reverse direction within a lesser range of maximum torque independently of said forward friction means and said spring means maintaining a minimum torque transmission according to the adjustment thereof.

ELMER C. KIEKHAEFER.

REFERENCES CITED

The following references are of record in the file of this patent:

UNITED STATES PATENTS

| Number | Name | Date |
|---|---|---|
| 1,195,146 | Miller | Aug. 15, 1918 |
| 1,910,561 | Pierce | May 23, 1933 |
| 2,070,406 | Irgens | Feb. 9, 1937 |
| 2,071,634 | Irgens | Feb. 23, 1937 |
| 2,402,197 | Kincannon | June 18, 1946 |

FOREIGN PATENTS

| Number | Country | Date |
|---|---|---|
| 46,346 | Sweden | Jan. 7, 1920 |